United States Patent [19]

Evert et al.

[11] Patent Number: 5,055,328

[45] Date of Patent: Oct. 8, 1991

[54] DIFFERENTIALLY CROSS-LINKED MULTILAYER FILM

[75] Inventors: Charles P. Evert, Centerville, Ia.; John Nelson, Anniston, Ala.

[73] Assignee: Viskase Corporation, Chicago, Ill.

[21] Appl. No.: 367,832

[22] Filed: Jun. 16, 1989

[51] Int. Cl.$^5$ ............................................... B32B 27/08
[52] U.S. Cl. .................................... 428/34.9; 428/35.2; 428/35.4; 428/516; 428/518; 428/520
[58] Field of Search ..................... 428/34.9, 35.2, 35.4, 428/516, 518, 520

[56] References Cited

U.S. PATENT DOCUMENTS

| | | | |
|---|---|---|---|
| 3,456,044 | 7/1969 | Pahlke | 264/25 |
| 3,900,635 | 8/1975 | Funderbuck, Jr. et al. | 428/518 |
| 4,351,876 | 10/1982 | Doi et al. | 428/349 |
| 4,724,176 | 2/1988 | Sun | 428/518 |
| 4,726,997 | 2/1988 | Mueller et al. | 428/480 |
| 4,737,391 | 4/1988 | Lustig et al. | 428/518 |
| 4,853,265 | 8/1989 | Warren | 428/212 |
| 4,880,696 | 11/1989 | Yanidis | 428/349 |

FOREIGN PATENT DOCUMENTS 1125229 6/1982 Canada .
172923 10/1982 Japan .

*Primary Examiner*—James J. Seidleck
*Attorney, Agent, or Firm*—Cederic M. Richeson; John C. LeFever

[57] ABSTRACT

A tubular article formed of multilayer differentially cross-linked heat sealable film suitable for the manufacture of bags used in the packaging of meats. The multilayer film contains at least two layers the inner of which is a heat sealable layer containing an antioxidant cross-linking inhibitor in an amount sufficient to inhibit the cross-linking of that layer by irradiation. Accordingly, upon exposure of the multilayer film to radiation, the outer layer will be cross-linked to a greater extent than the first heat sealable layer.

40 Claims, No Drawings

DIFFERENTIALLY CROSS-LINKED MULTILAYER FILM

FIELD OF THE INVENTION

This invention relates to an irradiated multilayer film which can be formed into packaging bags for example for foods such as primal and sub-primal meat cuts, and poultry. In particular, this invention relates to a tubular article formed of biaxially oriented irradiated multilayer film wherein at least one of the layers is cross-linked to a different extent than the other layers.

BACKGROUND OF THE INVENTION

Primal meat cuts are generally smaller than a side of beef, but larger than the ultimate cut sold to the retail consumer. Primal cuts are prepared at the slaughter house and shipped to retail meat stores or restaurants where they are butchered into smaller cuts of meat commonly referred to as sub-primal meat cuts. Sub-primal cuts, however, may also be prepared at the slaughter house.

Primal and sub-primal cuts are packaged to minimize air (i.e. oxygen) exposure and prevent meat spoilage and discoloration during shipping and handling. One common way to package primal and sub-primal cuts and protect them from the adverse effects of air is to shrink package the cuts in a film having good oxygen barrier properties.

For example, a multilayer film having a barrier layer containing polyvinylidene chloride (PVDC) is a well known packaging material. PVDC is known by those skilled in the art to have excellent oxygen barrier properties. The other layers of the multilayer film function to protect the PVDC layer and provide the requisite low temperature and abrasion resistance properties which the PVDC layer lacks.

There are other types of biaxially oriented heat shrinkable multilayer films which do not require oxygen barrier properties, for example films to be used for shrink wrapping poultry.

Shrinkage properties may be produced in a film by biaxially stretching the film in the machine and transverse direction. The resulting film will heat shrink within a specified range of percentages such as from about 20 to about 50 percent at about 90° C.

Multilayer heat shrinkable film may also be formed into packaging bags. Bags are generally made by transversely sealing a tubular stock of multilayer film and cutting or splitting the tube, or by superimposing flat sheets of multilayer film and sealing on three sides, or by end folding flat sheets and sealing the two sides. A common type of seal used in manufacturing bags is known to those skilled in the art as a hot bar seal in which the adjacent thermoplastic layers are sealed together by application of heat and pressure across the area to be sealed, using contact with opposing bars of which at least one is heated to cause the adjacent layers to fusion bond. For example, bags manufactured from a tube stock generally require one hot bar seal transverse to the tube. This seal is also referred to as a bottom seal. Once the bottom seal is applied, the tube stock is transversely cut to form the mouth of the bag. The strength of seals may be measured by determining the time for a seal to fail when under certain conditions the seal is immersed in hot water at 95° C. i.e., the hot water seal strength ("HWSS") may be measured by a test such as that described as the "restrained shrinkage-seal strength test" in Funderburk et al U.S. Pat. No. 3,900,635.

Once meat or poultry is inserted into the bag, the package is evacuated and the bag mouth must be sealed. At one time, the standard method for sealing a bag was to fasten a clip around the mouth of the bag. More recently, impulse heat sealing techniques have been employed to seal the bag mouth. In general, a bag mouth is impulse sealed by application of heat and pressure using opposing bars at least one of which has a covered wire or ribbon through which electric current is passed for a very brief time period (hence the name "impulse") to cause the adjacent film layers to fusion bond. Following the impulse of heat the bars are cooled while continuing to hold the bag inner surfaces together to achieve adequate sealing strength.

One problem with impulse heat sealing is that the film in the seal area often becomes extruded during sealing. This elongation of the product results in thinning of the film and in an extreme situation severing of the thinned film. The latter is known to those skilled in the art as burn-through. One solution to this "burn-through" problem is to irradiate the film prior to manufacture of the bag.

Irradiation of a multilayer film causes the various irradiated layers in the film to cross-link. Under controlled conditions, cross-linking by irradiation not only provides a higher temperature impulse heat sealing range, but also enhances the puncture resistance of the film.

Unfortunately, cross-linked thermoplastic films are not easy to melt, making it difficult for food packagers to achieve strong seals, particularly by impulse sealing the bag mouths after filling with meat or poultry. All of the bag seals (including both the sealed bottom as for example made by the bag manufacturers with a hot bar and the impulse-sealed bag mouth by the food processor) must maintain their integrity when the food-containing package is immersed in hot water to shrink the film against the packaged food. Thus, there is a need for a multilayer film which can be made into a bag having both strong bottom or side seals effected by hot bar sealing or even impulse sealing, and strong mouth seals effected by impulse heat sealing. The film outer layer, which typically contacts the sealing apparatus, should provide high burn-through resistance during sealing and the inner layer should be capable of forming seals having high hot water seal strength.

It is known that heat shrinkable bags for food packaging may be fabricated from multilayer film having a difference in degree of cross-linking of the respective layers of the film. This difference of the degree of cross-linking can be obtained by irradiation of individual layers followed by lamination or extrusion coating. These techniques, however, employ multiple irradiation and/or multiple extrusion or lamination steps.

Canadian Patent 1,125,229 discloses a film structure having a heat sealable inner layer and an outer layer wherein the outer layer is cross-linked to a larger extent than the heat sealable layer. The differential cross-linking is achieved by adding a cross-linking enhancer compound to the outer layer, forming the structure, and then irradiating. The irradiation enhancer allows the irradiation dosage to be lowered to a point where the heat sealable inner layer is not adversely affected in its heat sealing characteristics by the radiation. However, a major problem with this film structure is that by lowering the irradiation dosage, the other beneficial effects which irradiation provides, such as puncture resistance, are surrendered.

Sun U.S. Pat. No. 4,724,176 describes a heat shrinkable bag with an unirradiated inner layer, an oxygen barrier core layer, and an irradiated outer layer. The film used to fabricate this bag is prepared by coextrusion and then controlled irradiation to only cross-link the outer layer. This approach requires precise control of the cross-linking and does not permit enhancement of inner layer puncture strength by cross-linking.

It is also known that manufacturers of thermoplastic resins frequently include limited quantities of antioxidants to improve thermal stability of the resin during storage and processing. These antioxidants tend to retard cross-linking in film extruded from the resin.

The discovery of a differentially cross-linked multilayer film which can be produced by exposure to only one dosage of irradiation and yet still retains the other beneficial effects of irradiation would be widely accepted by those skilled in the art and meet with substantial commercial success.

It is therefore an object of the present invention to provide a differentially cross-linked multilayer film having high hot water seal strength, high burn-through resistance, a broad impulse sealing range and enhanced puncture resistance. It is a further object of the present invention to provide a differentially cross-linked multilayer film having these improvements after exposing the film to only one irradiation dosage. It is still a further object of the present invention to provide a multilayer film structure which can be more easily and efficiently formulated into a packaging bag. It is yet another object of the present invention to provide a meat and poultry packaging bag having both improved bottom and edge seals formed by e.g. hot bar sealing and after food is packaged therein, and improved mouth seals formed by impulse heat sealing. It is still yet another object of the present invention to provide a method for manufacturing a multilayer film having the differential cross-linking characteristics described above.

It is to be understood that these objectives as well as others which are apparent in view of the specification are not to be considered a limitation of the present invention, the scope of which is defined by the appended claims.

In accordance with one aspect of the invention, a tubular article is provided which is formed of biaxially oriented, differentially cross-linked, heat shrinkable multilayer film irradiated to at least about 2 megarad (MR). This film comprises a thermoplastic inner layer and a thermoplastic outer layer, the irradiated inner layer containing an antioxidant in sufficient quantity to adjust its melt flow index to at least about 0.5. The irradiated outer layer has a melt flow index of less than about 0.7, and the ratio of the melt flow indices of the inner layer to the outer layer is at least about 1.5. The inner and outer irradiated layers may be adhered together but in a preferred embodiment the inner and outer layers are separated by an oxygen barrier layer.

At least the irradiated inner layer must be heat sealable to itself, i.e., be capable of fusion bonding by conventional indirect heating means which generate sufficient heat on at least one film contact surface for conduction to the contiguous film contact surface and formation of a bond interface therebetween without loss of the film integrity. Also, the bond interface must be sufficiently thermally stable to prevent gas or liquid leakage therethrough when exposed to above or below ambient temperatures during processing of food within the tube when sealed at both ends, i.e., in bag form. Finally, the bond interface between contiguous inner layers must have sufficient physical strength to withstand the tension resulting from stretching or shrinking due to the food body sealed within the tube.

As used herein, "antioxidant" means an additive to the first layer resin which retards oxidation, i.e., cross-linking, of that layer on irradiation.

Another aspect of the invention relates to a method of manufacturing a tubular article formed of biaxially oriented differentially cross-linked, heat shrinkable multilayer film. In this method a tube of multilayer blown film is formed comprising a thermoplastic inner layer and a thermoplastic outer layer with the inner layer containing an antioxidant. The multilayer film is biaxially oriented to make same heat shrinkable. The biaxially oriented heat shrinkable multilayer film is then irradiated at a dosage of at least about 2 MR to simultaneously adjust the inner layer melt flow index to at least about 0.5 and adjust the outer layer melt flow index to less than about 0.7 such that the ratio of the melt flow indices of the inner layer to the outer layer is at least about 1.5.

A still further aspect of the invention relates to a food storage bag formed of biaxially oriented, differentially cross-linked and heat shrinkable multilayer film irradiated to at least about 2 MR. This film comprises a thermoplastic inner layer and a thermoplastic outer layer, the irradiated inner layer containing an antioxidant in sufficient quantity to adjust its melt flow index to greater than about 0.5. The irradiated outer layer has a melt flow index of less than about 0.7 such that the ratio of the melt flow indices of the inner layer to the outer layer is at least about 1.5. One end of the bag is heat sealed by adhesion between contiguous inner layer surfaces in a direction transverse to the oppositely located side walls of the bag. The mouth end of the bag is impulse heat sealable by fusion bonding between contiguous inner layer surfaces after filling the bag with food.

DETAILED DESCRIPTION OF PREFERRED EMBODIMENTS

Upon exposure to irradiation, polymers undergo a sequence of chemical reactions resulting in radical formation and peroxide oxidation. Irradiation initiates radical formation and in the presence of oxygen the radical and the oxygen units produce a peroxy radical. The peroxy radical causes auto-oxidation by abstracting a neighboring labile hydrogen to form a hydroperoxide and another free radical. These reactions propagate until inert products are formed through free radical combinations, terminating the auto-oxidation. This termination is commonly referred to as cross-linking and results in an increase in viscosity and toughness of the polymer. The extent of cross-linking can be measured by a change in melt flow index (MFI).

Melt flow index is an indication of the rate of extrusion of a molten thermoplastic resin through a die of a specified length and diameter under prescribed conditions of temperature, load and piston position in the barrel as the time measurement is being made.

Under controlled conditions, polymeric multilayer films can be irradiated to produce a cross-linked product having greater puncture resistance characteristics and other enhancements known to those skilled in the art. However, exposure to irradiation also causes a reduction of heat sealability in other layers at conventional temperatures, pressures and times using typical heat sealing equipment thereby resulting in poor bottom and edge seals in bags made from the film. However, in the practice of this invention it has been found that the addition of an antioxidant in sufficient quantity to the heat sealing first (inner) layer inhibits cross-linking to the extent that a relatively high melt flow index of at least about 0.5 is obtained. At the same time the second (outer) layer of the multilayer film is selected so as to have a relatively low level of antioxidant and optionally may contain a cross-linking enhancer, thereby providing a relatively low melt flow index of less than about 0.7 in this layer. Further, these constituent additives or reductions are such that the multilayer film, which only requires a single irradiation treatment, provides a combination of improved hot water puncture resistance and high burn-through resistance. Based on information available to the inventors, this particular beneficial combination has not been achieved in prior art biaxially oriented heat shrinkable multilayer films and represents a substantial improvement in this art.

As used in accordance with the present invention, the term "antioxidant" is a chemical composition which, when blended with a polymer, produces a material which cross-links to a lesser extent at a given radiation dosage than does the same polymer without the cross-linking inhibitor. Thus, any chemical composition which, when blended with a polymer, produces upon irradiation a cross-linked product having a higher melt flow index than the same polymer at the same irradiation dosage level without the chemical composition is a cross-linking inhibitor.

According to the present invention, preferred cross-linking inhibitors include those chemical compositions known as free radical scavengers. Free radical scavengers inhibit or retard oxidation and the degradative effects on a polymer system which occur as a result of oxidation upon irradiation. These compositions inhibit oxidation by their reaction with chain propagating radicals resulting in the transfer of hydrogen to the radical. Free radical scavengers are also known as primary antioxidants.

These primary or chain terminating antioxidants generally have a reactive NH or OH functional group as secondary aryl amines or hindered phenols. Specific antioxidants contemplated by the present invention include but are not limited to 2,6 ditert butyl-4-ethyl phenol (BHEB) and butylated hydroxytoluene (BHT). Another suitable antioxidant agent is tetrakis [methylene 3-(3', 5'-di-t-butyl-4'- hydroxyphenyl) propionate] methane. This material is believed to be a symmetrical molecule which includes four sterically hindered phenolic hydroxyl groups and has a molecular weight of about 1178. This material is available from by Ciba-Geigy under the trade designation Irganox ® 1010.

The antioxidants contemplated by the present invention are not believed to completely inhibit oxidation of the polymer, but when employed in the amount contemplated, they sufficiently retard the rate of auto-oxidation throughout the useful life of the polymer material.

The quantity of antioxidant required to achieve melt flow index values of at least 0.5 in the heat sealing layer of this multilayer film is believed to be substantially higher than the quantity added by resin manufacturers for stability. For example, a currently available EVA resin with 12 wt % VA contains BHT antioxidant and has a MFI of about 0.43 when irradiated to about 3 MR.

In accordance with one embodiment of the present invention, an antioxidant cross-linking inhibitor is added to a heat sealable inner thermoplastic layer of a multilayer film in the form of a tubular article. The antioxidant is added in sufficient quantity to adjust the melt flow index of the layer in the irradiated state to at least about 0.5. Also the melt flow index of the outer thermoplastic layer in the irradiated state is adjusted to below about 0.7. These adjustments are such that the ratio of the melt flow indices of the first outer layer to the second outer layer is at least about 1.5. Suitably, the inhibitor is added in an amount between about 500 to about 2000 parts per million (PPM), preferably about 800 to about 1600 PPM by weight of the layer based on antioxidant equivalency to BHT "BHT Equivalency"). The antioxidant may be added in any manner known in the art, including blending with the polymer in the solid form or as a hot melt. As used herein BHT Equivalency is the amount of an alternative antioxidant required to manufacture a multilayer film of the invention with an equivalent melt flow ratio to an otherwise identical multilayer film with a specific amount of BHT in the heat sealable inner layer of the film, and produced by the identical method. By way of example, assume 1000 ppm BHT is included in an EVA inner layer prepared from a resin having 10% vinyl acetate content and the melt flow index of this layer in a particular film irradiated to 4 MR is 1.00. If only 750 ppm of a particular alternative antioxidant is required in the inner layer of an otherwise identical film to provide an inner layer melt flow index of 1.00, the BHT Equivalency of this film is 750 ppm.

Decreasing the amount of antioxidant in the heat sealing inner layer results in greater cross-linking while increasing antioxidant concentration tends to reduce the impulse voltage sealing range and impair the improved puncture resistance from cross-linking. Optimum amounts of added antioxidant will of course vary, depending upon such parameters as the particular polymers used to form the inner layer, the amount of antioxidant already present in the as-manufactured polymeric resin, and anticipated sealing conditions to which the film will be subjected. Suitable amounts of antioxidant to be added to the inner layer can be easily determined by one skilled in the art.

The heat sealable inner layer of the multilayer film of the present invention may be of any material conventionally used for its heat sealing capability. Conventional heat sealing materials comprise thermoplastic polymers or polymer blends. Thus, according to one embodiment, the heat sealable layer may comprise any thermoplastic polymer or polymer blend which is cross-linkable by irradiation and may be inhibited in its cross-linking ability by the presence of antioxidants contemplated.

Irradiated heat sealable thermoplastic polymers are recognized by those skilled in the art as being capable of heating sealing to themselves at a variety of time, pressure and temperature conditions. For example, at a given pressure either a relatively high temperature may be applied briefly or a lower temperature may be applied for a longer period of time to obtain similarly suitable seals. One of ordinary skill will recognize the depending upon such factors as the type of heat sealing equipment used, sealing parameters such as temperature, pressure and time of application may be selected without undue experimentation.

The preferred material contemplated by the present invention for use as the heat sealable inner layer is ethylene vinyl acetate as at least the major constituent. Further, the inner layer more preferably comprises at least 50 weight percent EVA and most preferably at least 70 weight percent EVA. The EVA may contain between about 3% and about 18% vinyl acetate. Other suitable polymers and copolymers include alpha olefins such as members of the polyethylene family such as linear low density polyethylene (LLDPE), very low density polyethylene sometimes referred to as ultra low density polyethylene (VLDPE and ULDPE) respectively. Still other suitable thermoplastic polymers as the heat sealable inner layer include polypropylene, ethylene-propylene copolymer or an ionomer. It is to be understood however that the thermoplastic polymers mentioned herein are not intended to be an exhaustive list, but merely exemplary.

Upon exposure to irradiation sufficient to cause cross-linking, heat sealable layers generally tend to diminish their heat sealing ability. However, in accordance with the present invention, the addition of antioxidant to the heat sealable inner layer of the tubular article inhibits the cross-linking within the polymer; thereby reducing the adverse effects of radiation upon the heat sealing properties. Addition of an antioxidant further allows the irradiation dosage to be sufficiently high to allow other layers of the multilayer film to retain the beneficial effects of irradiation.

In accordance with a preferred embodiment, the present invention in the form of a tubular article comprises a multilayer film having a thermoplastic inner layer, an oxygen barrier layer, and a thermoplastic outer layer. The inner layer contains an antioxidant in sufficient quantity such that upon irradiation of the multilayer film the inner layer's melt flow index is adjusted to at least about 0.5 preferably 0.7 and the outer irradiated outer layer's melt flow index is less than 0.7. The ratio of the melt flow indices of the inner layer to the outer layer is at least about 1.5 preferably at least about 2 and most preferably at least about 4. The tubular multilayer film may be formed into bags useful for the packaging of meats. The multilayer film is especially useful for those bags manufactured by hot bar or impulse sealing or a combination thereof, and after meat is inserted therein, the mouth is sealed by impulse heat sealing.

Accordingly, the bag from the tubular multilayer film is manufactured such that the inner layer forms the inside portion of the bag while the outer layer forms the outside portion of the bag. Accordingly, the inner layer of the tubular multilayer film is the heat sealable layer which is easily sealed by hot bar sealing due to its lower degree of cross-linking. Moreover, because of the latter, the mouth of the bag may be more easily sealed by impulse heat sealing when desired.

Preferably, the heat sealable inner layer of the multilayer film is an ethylene-vinyl acetate copolymer (EVA) containing from about 3 to about 18 weight percent of vinyl acetate (VA), based on the weight of the copolymer. The vinyl acetate content of the EVA should be at least about 3 wt % to provide the desired high shrink, but no higher than about 18 wt % to allow the needed biaxial orientation. Higher vinyl acetate content makes the film excessively soft and not capable of biaxial orientation. A preferred balance between these characteristics is a vinyl acetate content of between about 6 and about 15 wt % of the ethylene vinyl acetate.

The thermoplastic inner layer has a melt flow index of at least about 0.5 g/10 min and preferably at least about 1.0 g/10 min. An inner layer having a melt flow index below about 0.7 g/10 min is difficult to melt and form, therefore not acceptable for the purpose of hot bar sealing. Preferably, the heat sealable inner layer will have a melt flow index between about 0.7 and about 2.0 g/10 min.

The thickness of the heat sealable inner thermoplastic first layer is preferably between about 0.5 and about 2.0 mils. Thinner layers may not perform the aforedescribed functions while thicker layers do not appreciably improve processability of the film and may reduce total film performance. Accordingly, they would be uneconomical.

In a preferred embodiment, the inner and outer thermoplastic layers are adhered to opposite sides of a barrier core layer. The functional requirement of the barrier layer is that together with the other layers it must provide an oxygen transmission rate through the entire multilayer film below about 5 cc/100 in.$^2$/ 24 hrs/Atm. This is necessary to avoid spoilage of certain food products, for example meat enclosed in the multilayer film package due to oxygen passage from the environment through the film wall. This requirement may be satisfied by numerous well-known barrier layer materials as for example certain of the polyamides (Nylon), hydrolyzed ethylene vinyl acetate copolymer (EVOH) and preferably a vinylidene copolymer. Vinylidene chloride-vinyl chloride (PVDC) is the most commonly used copolymer but the vinyl chloride discolors on exposure to substantial irradiation dosage (more than about 2 MA) so the vinylidene chloride-methyl acrylate copolymer (MA-VDC) is preferred to avoid discoloration on irradiation. The use of this preferred copolymer as a barrier layer in a multilayer film is described in Lustig et al U.S. Pat. No. 4,714,638. Another satisfactory oxygen barrier layer is a blend of vinylidene chloride-methyl acrylate copolymer and vinylidene chloride-vinyl chloride copolymer having 2.9–13.5 wt % methyl acrylate and 2.9–11.6 wt % vinyl chloride. This blend is described in Schuetz U.S. Pat. No. 4,798,751. As explained therein, this blend provides the advantages of no discoloration on irradiation with MA-VDC and processing ease of PVDC.

The barrier layer thickness is preferably between about 0.1 and about 0.5 mils. Thinner barrier layers may not perform the intended functions and thicker layers do not appreciably improve performance.

In the barrier layer embodiment of this invention the outer thermoplastic layer of the enclosing multilayer film is on the opposite side of the core layer from the inner layer, and in the preferred three layer embodiment this outer layer is both directly adhered to the core layer and in direct contact with the environment. Since it is seen by the use/consumer, it must enhance optical properties of the film. Also, it must withstand contact with sharp objects so it is termed the abuse layer and provides abrasion resistance.

The outer layer is preferably formed of ethylene vinyl acetate as at least the major constituent, more preferably at 50% weight percent EVA and most preferably at least 70 weight percent EVA. Also, the outer layer preferably has the same range of between about 3% and about 18% vinyl acetate content and for the same reasons as in the inner layer.

Alternatively, the outer layer may be formed of other thermoplastic materials as for example polypropylene, ethylene - propylene copolymer, ionomer, or an alpha olefin and in particular a member of the polyethylene family such as linear low density polyethylene (LLDPE), very low density polyethylene (VLDPE and ULDPE) respectively, or blends of these materials.

The thermoplastic outer layer thickness is preferably between about 0.5 and 1.0 mils. Thinner layers may be less effective in performing the abuse resistance function, while thicker layers may reduce film stretchability.

The outer layer must be formed of a material which is readily cross-linkable so that on irradiation its melt flow index is reduced below about 0.7. From this standpoint, EVA with 10% vinyl acetate content is preferred as at least the major constituent.

In accordance with another embodiment the second outer layer may contain a cross-linking enhancer. As used herein, the term "cross-linking enhancer" is a chemical composition which when blended with a polymer produces a material which cross-links to a greater extent at a given radiation dosage than does the same polymer without the cross-linking enhancer. Thus, any chemical composition which when blended with a polymer produces upon irradiation a cross-linked product having a lower melt flow index than the same polymer at the same irradiation dosage level without the chemical composition is a cross-linking enhancer.

Many cross-linking enhancers are known in the art. Accordingly, any such enhancer may be employed in the second outer layer of the multilayer film. Organic peroxides are suitable cross-linking enhancers for use in this invention. These include but are not limited to, dichlorobenzoyl peroxide, benzoyl peroxide, dicumyl peroxide, di-tert-butyl peroxide, 4,5-dimethyl-2,5-di(-peroxy benzoate)hexyne-3, 1,3-bis(tert-butyl peroxy isopropyl)benzene, lauroyl peroxide, tert-butyl peracetate, 2,5-dimethyl-2,5-di(tert-butyl peroxy)hexyne-3, 2,5-dimethyl-2,5-di(tert-butyl peroxy)hexane and tert-butyl perbenzoate. However, the cross-linking enhancers most preferred include trimethylopropane and trimethylacrylate. It is to be understood that the cross-linking enhancers mentioned herein are not to be a limitation of the present invention but are merely exemplary.

The cross-linking enhancer may be added to the second outer layer by any known conventional technique. Accordingly, the cross-linking enhancer may be mixed with the polymers making up a layer in the powder form by blending the enhancer into the polymer while in the molten state, by diffusing the enhancer in a gaseous or liquid form into the polymer, and the like. Preferably, the enhancer is mixed with the polymer in the powder form prior to melting. The enhancer may be employed in amounts between about 0.001 to about 0.025 wt % of the layer preferably about 0.007 to about 0.015 wt %. It is to be understood, however, that the exact amount of enhancer is not critical to the invention and is dependent upon the extent of differential cross-linking in the multilayer film intended.

The thermoplastic outer layer preferably has a thickness of from about 0.4 mil to about 1 mil to perform the aforedescribed functions, and the preferred three layer film will generally have a total thickness of from about 1.6 mils to about 3.0 mils preferably of from about 1.8 mils to about 3.0 mils. Lower thicknesses reduce the effectiveness of at least one of the three layers while higher thicknesses reduce the film flexibility and do not appreciably improve its performance.

In general, various conventional additives such as slip agents and pigments can be incorporated in the film in accordance with conventional practice.

While this preferred embodiment of the invention is specifically described in terms of three layers, it should be understood that one or more additional layers may be directly adhered to the outside of the outer layer or between the barrier layer and the inner layer, or in place of the barrier layer, but not inside the inner layer. This additional layer may for example be EVA, LLDPE, VLDPE, polypropylene, EVOH, polyurethane, acrylonitrile nylon, ionomer, or blends thereof. For example, if the outer layer of a barrier-type film is EVA a fourth layer may be interposed between the EVA layer and the barrier layer.

The multilayer film of this invention can be produced by known techniques such as by co-extruding the multiple layers into a primary tube, followed by biaxially stretching the tube by known techniques to form a heat shrinkable film. The "double bubble" technique disclosed in Pahlke U.S. Pat. No. 3,456,044, can be used to produce the film of this invention. Alternatively, the film may be a slot cast co-extruded multilayer film which is subsequently biaxially stretched. After biaxial stretching, the multilayer film is then irradiated preferably to a dosage level of between about 2 megarads and about 5 megarads, such as by passing it through an electron beam irradiation unit. The multilayer film may then be employed to manufacture heat shrinkable bags useful in packaging primal and sub-primal meat cuts and processed meats.

Bags may be produced from the multilayer film of this invention by any suitable method, but preferably by hot bar heat sealing. For instance, if the film of this invention is produced in a tubular stock, bags can be produced by hot bar sealing one end of a length of the tubular film or at any number of longitudinally spaced positions across the tube width, and then cutting the tube or splitting one edge to form the bag mouth. If the film of this invention is made in the form of flat sheets, bags can be formed by hot bar sealing three edges of two superimposed sheets of film. When carrying out the hot bar sealing operations, the surfaces which are heat sealed to each other to form seams are the first outer layers containing the antioxidant of the multilayer films of the invention. Thus, for example, when forming a bag by heat sealing one edge of the length of tubular film, the inner surface of the tube, i.e., the surface which will be heat sealed to itself, will be the inner layer of the tubular multilayer film.

EXAMPLE 1

In this series of tests, bags of the same size (22 inches long × 12 inches wide) were fabricated from three layer films comprising a heat sealable thermoplastic inner layer with ethylene vinyl acetate (EVA) as at least the major constituent, a vinylidene chloride copolymer type oxygen barrier layer adhered on one side to the sealable inner layer, and a second thermoplastic outer layer adhered to the opposite side of the oxygen barrier layer and also formed of EVA. The three layer film was the biaxially oriented heat shrinkable type, prepared by the double or trapped bubble method as broadly described in the aforementioned Palkhe U.S. Pat. No. 3,456,044. In particular, all three layers were simultaneously coextruded. Certain of the film samples were cross-linked by irradiation after biaxial orientation, i.e. post-irradiated, in the manner generally described in Lustig et al U.S. Pat. No. 4,737,391. The total thickness of the multilayer films was the same for all samples, i.e., 2.17 mils, but the thicknesses of the inner and outer layers were varied.

Certain physical properties of bags were measured by either of the test procedures discussed below.

Melt Flow Index: ASTM D-1238, condition F (at 190° C. with 21.60 kg load on film). This ASTM test method is incorporated by reference into this disclosure.

Shrinkage values were obtained by measuring unrestrained shrink of the stretched film at 90° C. for five seconds. Four test specimens were cut from a given sample of the oriented film to be tested. The specimens were cut to 10 cm. in the machine direction by 10 cm. in the transverse direction. Each specimen was completely immersed for 5 seconds in a 90° C. water bath. The distance between the ends of the shrunken specimen was measured. The difference in the measured distance for the shrunken specimen and the original 10 cm. was multiplied by ten to obtain the percent of shrinkage for the specimen. The shrinkage for the four specimens was averaged for the MD shrinkage values of the given film sample, and the shrinkage for the four specimens was averaged for the TD shrinkage value.

The impulse sealing range test is run to determine and compare the acceptable voltage ranges for impulse sealing plastic films. A Sentinel Model 12-12AS laboratory sealer manufactured by packaging Industries Group, Inc., Hyannis, Mass. was used. This impulse sealer was equipped with a replacement sealing ribbon for a Multivac AG100. The ribbon is available from Koch Supplies of Kansas City, Mo. In this test, two four inch wide (T.D. direction) samples are cut from a tubular film. The impulse sealer is equipped with controls for coolant flow, impulse voltage and time, and seal bar pressure. These controls except for impulse voltage were set at the following conditions:

0.5 seconds impulse time (upper ribbon only)
2.2 seconds cooling time
50 psi (345 kPa) jaw pressure
0.3 gallon per minute (1 liter per minute) cooling water flow One of the samples was folded in half for use in determining a minimum sealing voltage. This folding simulates folding which may inadvertently occur during conventional bag sealing operations. The folded sample which now had four layers was placed into the sealer and by trial and error the minimum voltage to seal the bottom two layers to each other was determined.

The maximum voltage was then determined for the two layer sample by placing it in the sealer and then activating the seal bar. The film sample was manually pulled with about 0.5 lbs. of force and the voltage which does not cause burn-through or significant distortion of the seal was determined.

As previously explained, in commercial use bags were filled with food product, as for example poultry, evacuated through the mouth end and sealed, as for example, by an impulse sealing machine. The seal strength of the sealed test bags was determined by a Hot Water Seal Strength (HWSS) test designed to simulate a poultry packaging application. A metal frame fabricated from wire was employed to simulate the poultry to be packaged, and the frame was placed inside the test bag. The so-opened bag and test frame was then immersed in water at 95° C.±0.5° C. with the seals at the bottom end, and the time to failure of the seal was measured. This procedure for measuring HWSS is described more completely in the previously mentioned Funderburk et al U.S. Pat. No. 3,900,635, incorporated herein by reference.

The results of these tests are summarized in Table A.

TABLE A

| | | | | | | | Inner Layer Antioxidant | | | | | |
| | | | | | | | Voltage | | | | | |
| Sample No. | Outer Layer Type | Outer % Total Film Thickness | BHT (PPM) | IRR (MR) | Shrnk MD (%) | Shrink TD (%) | Min Seal . Burn-Through (Sealing Range) | HWSS | Melt Flow Index Inner | Outer | Ratio | Type Seal |
|---|---|---|---|---|---|---|---|---|---|---|---|---|
| 1 | H$^{(a)}$ | 26 | 0 | 3 | 42 | 51 | 29.0  46.0 (17.0) | 10.8 | 0.14 | 1.72 | 0.08 | Side |
| 2 | H$^{(a)}$ | 38 | 1600 | 4 | 42 | 50 | 29.0  43.8 (14.8) | 17.2 | 0.71 | 0.47 | 1.5 | Side |
| 3 | E$^{(b)}$ | 26 | 0 | 3 | 42 | 50 | 29.8  47.2 (17.4) | 16.9 | 0.16 | 0.55 | 0.3 | Side |
| 4 | E$^{(b)}$ | 38 | 1600 | 3 | 44 | 53 | 31.2  39.8 (8.6) | Burn Seal | 3.64 | 0.43 | 8.5 | Side |
| 5 | E$^{(b)}$ | 38 | 1600 | 4 | 43 | 51 | 31.6  45.6 (14.0) | 17.2 | 0.94 | 0.10 | 9.4 | End |
| 6$^{(c)}$ | E$^{(b)}$ | 38 | 1600 | 4 | 43 | 51.5 | 32.4  47.4 (15.0) | 22.2 | 0.74 | 0.19 | 3.9 | End |
| 7$^{(c)}$ | E$^{(b)}$ | 26 | 1600 | 4 | 42 | 51.5 | 30.0  44.2 (14.2) | 28.5 | 0.74 | 0.25 | 3.0 | End |
| 8$^{(d)}$ | E$^{(b)}$ | 38 | 1600 | 4 | 40 | 48.0 | 32.0  45.8 (13.8) | 15.0 | 0.63 | 0.19 | 3.3 | End |
| 9$^{(d)}$ | E$^{(b)}$ | 26 | 1600 | 4 | 39 | 46.0 | 32.2  44.8 (12.6) | 30.0 | 0.96 | 0.26 | 3.7 | End |
| 10 | H$^{(a)}$ | 26 | 0 | 3 | 42 | 51 | 29.0  46.0 (17.0) | 10.0 | 0.19 | 1.50 | 0.12 | End |

$^{(a)}$Eva blend comprising 74% of 12% VA and 23.5% of 4.5% VA so average was 9.93% VA; film included 2.5% slip agent
$^{(b)}$10% VA in EVA; 1.5% processing aid
$^{(c)}$Inner layer included 10% VLDPE
$^{(d)}$Inner layer included 30% VLDPE Samples 1 and 10 are a type of bag in commercial use without extra antioxidant in the inner layer, and is the control for the experimental bags. The EVA outer layer (type H) was a blend of 74% of a 12% vinyl acetate (VA) type and 23.5% of a 4.5% VA type, the balance being slip agent. The low VA type EVA contained substantial antioxidant which was added by the resin manufacturer for thermal stability. The multilayer film of Samples 1 and 10 was post-irradiated at 3 MR in accordance with the teachings of U.S. Pat. No. 4,737,391. In Sample 2, 1600 ppm BHT antioxidant was added to the inner layer and the post-irradiation level was increased to 4 MR. The inner layer MFI increased substantially (from 0.14 to 0.71) and the outer layer MFI decreased (from 1.72 to 0.47). This substantially increased the HWSS (from 10.8 to 17.2 after 6 days). However, the burn-through voltage undesirably slightly decreased from 46.0 to 43.8 but this level was still considered commercially acceptable. Accordingly, Sample 2 is an embodiment of the invention.

Samples 3–9 employed a different type of EVA outer layer having 10% vinyl acetate content and substantially lower antioxidant content (indicated by the resin manufacturer) than the type used in Samples 1, 2, and 10. In Sample 3, there was no antioxidant added to the inner layer. The burn-through voltage was about the same as Sample 1 and the HWSS was significantly higher (16.9 vs. 10.8). Sample 3 is a commercially acceptable article and is not an embodiment of this invention.

In Sample 4, the outer layer percent thickness was increased from 26% to 38% of the total multilayer film (so the inner layer thickness was simultaneously decreased), and 1600 ppm BHT antioxidant was added to the inner layer. However, there was no benefit from these changes as both the burn-through voltage and the HWSS declined. Sample 4 shows the disadvantages of under cross-linking the inner layer, i.e., the high level of antioxidant limited the cross-linking and the melt flow index was relatively high, i.e., 3.64. The total structure did not have sufficient resistance to seal without burn-through under severe sealing conditions and the burn-through voltage was significantly reduced (47.2 to 39.8).

When the irradiation level was increased from 3 MR to 4 MR in Sample 5, there was improvement in both burn-through voltage (39.8 to 45.6) and HWSS remained about the same (12.3 to 15.9 after 6 days). That is, it was possible to increase the irradiation voltage and obtain more cross-linking in the outer layer (while retarding cross-linking in the inner layer because of the antioxidant) because of the lower antioxidant content included by the EVA resin by the manufacturer. The melt flow index of the inner and outer layers were 0.94 and 0.10 respectively, and the ratio was 9.4. Accordingly, Sample 5 is another embodiment of the invention.

Samples 6 and 7 differ from Samples 1–5 in two respects. The heat sealable inner layer contains 10 wt % very low density polyethylene ("VLDPE"), i.e. Attane type 4001 manufactured and sold by Dow Chemical Company. Also, the bag was end sealed by a hot bar instead of the impulse side sealing used to fabricate bag Samples 1–5. Sample 7 differs from Sample 6 only by decreasing the outer layer percent thickness from 38% to 26% of the total multilayer film, so the inner layer thickness was simultaneously increased. It will be noted that the HWSS was substantially higher than the other comparable Samples 1–5 employing the type E outer layer. This was due to a difference in data between end seal and side seal test equipment and the desire to test commercially average sealing conditions with these samples instead of the severe sealing conditions used in Samples 1–5. Samples 6 and 7 show substantially improved HWSS compared to Sample 10 (22.2 and 28.5 respectively vs. 10) and similar burn-through voltages (47.4 and 44.2 compared to 46). The melt flow indexes of the Sample 6 inner and outer layers are 0.74 and 0.19 respectively, and the ratio is 3.9. The melt flow indexes of the Sample 7 inner and outer layers are 0.74 and 0.25, and the ratio is 3.0. Accordingly, Samples 6 and 7 are also embodiments of the invention.

Sample 8 differs from Samples 6 and 7 by the inclusion of 30 wt % VLDPE in the heat sealable inner layer. Sample 9 differs from Sample 8 by increasing the inner layer thickness and decreasing the outer layer thickness from 38% to 26% of the total film. The principal effect was beneficial, i.e., there was less inner layer cross-linking than Sample 10, so higher MFI and the HWSS increased substantially. It should be understood that in general high concentrations of VLDPE adversely affect the optic properties of EVA type layer films, and also diminish the shrink properties to a limited extent. Nevertheless, Samples 8 and 9 are embodiments of the invention.

Although not clearly demonstrated in Example 1 and Table A, an improved, i.e., broader impulse sealing range is expected from the practice of this invention because the inner layer will flow more easily under typical pressure/temperature/dwell settings of the sealer to create a seal, and the outer layer will not extrude away from the seal ribbon, thus preventing burn-through.

EXAMPLE 2

In another series of tests, experiments were conducted on a packing plant production line using various types of bags to package ham sections, i.e., butts. The purpose of these tests was to compare the frequency of leakage in impulse-sealed bags of various types under typical commercial packaging conditions. The films used to fabricate these bag samples were certain of the types described in Example 1, and additional as an additional control Sample 11. This Sample 11 is a 2.5 mil thick, four layer film of the type EVA/VLDPE/PVDC/EVA that was manufactured by the Cryovac Division of W. R. Grace Company, and marketed as type B550. The two inner layers are irradiated. This film is sold for heavy duty packaging of processed meats. The antioxidant level in the inner layer is believed to be only that included by the EVA resin manufacturer for thermal stability.

On the first day of operation, Sample 10 (not of the invention) and Samples 5, 6 and 7 type bags (of the invention) were used to package ham butts and sealed with a Cryovac Series 8600 impulse sealing machine operating at a voltage of about 25–28 volts. During the sealing operation, air was evacuated from the ham butt containing bag and the evacuated bag was temporarily sealed by mechanically clamping it at a location across the mouth end and then spaced inwardly from the clamp the bag was impulse sealed. The excess film was severed from the sealed bag by a knife cutting across the mouth end between the impulse seal and the clamp. Thirty meat product-containing bags of each type were prepared and the number of leaking bags attributed to bad seals were determined and are reported in Table B. Leakage was determined by visual inspection of the packaged meat. After the packaged product emerged from the shrink tunnel those packages that had a loose film appearance and/or bulges were removed. Packages with a good vacuum closely follow the contour of the meat. These bags are inflated by puncturing the film with a stainless steel needle through which sufficient air is added to expand the bag so that it has enough air to allow determination of leaks by submersion of the bag in a tank of water followed by visual inspection for air bubbles. Care is taken not to admit so much air as to stress the bags and its seals.

On the second day of operation, Sample 11 (control not of the invention) was used to package ham butts and Sample 1 (control not of the invention) was used to package a mixture of ham butts and shanks. The number of leaking bags attributable to bad seals was determined. For Sample 1 the bags determined to be leakers were 8 of 204 and for Sample 11 the leaker rate was 9 of 100.

TABLE B

| | Ham Packaging | | | | |
|---|---|---|---|---|---|
| Sample No. | Outer % Total Film Thickness | Film Gauge (mil) | BHT (PPM) | IRR (MR) | Butt Leakers* |
| 1 | 26 | 1.8 | 0 | 3 | 9/30 |
| 5 | 38 | 1.8 | 1600 | 4 | 9/30 |
| 6 | 38 | 1.8 | 1600 | 4 | 4/30 |
| 7 | 26 | 1.8 | 1600 | 4 | 1/30 |

*Ratio is the number of leaking bags/total tested bags

Table B shows that with respect to the number of leaking seals, Sample No. 7 (an embodiment of this invention) was far superior to the other samples, consistent with its high HWSS. This was probably due to its relatively thick inner layer and the inner layer's 10% VLDPE content. Sample No. 6 (of the invention) also contained 10% VLDPE and had improved leaker rate, whereas Sample No. 5 (also an embodiment of this invention) was comparable with the control Sample 1.

Summarizing Example 2 and Table B, they demonstrate that certain embodiments of this invention provide exceptionally strong impulse seals (relatively few leaks) in the bag packaging of meat products. Moreover, these qualities may be achieved with relatively low VLDPE content in the EVA inner layer, so that optical properties may be maximized (for example, high gloss and low haze) and high shrink percentages are realized despite the use of VLDPE.

EXAMPLE 3

Still another series of tests were conducted on a packing plant production line using two types of bags to shrink package boneless turkey breasts. The purpose of these tests was to compare the frequency and types of leakage in impulse-sealed bags of two types under typical commercial package conditions and rates. The films used to fabricate these bag samples were two types described in Example 1, i.e., control Sample 3 without antioxidant added to the inner layer and Sample 7 with added antioxidant. However, the control Sample 3 was relatively thick, i.e., 3 mils instead of the 2.17 mil thickness of Sample 7. A relatively thick Sample 3 was used because the thinner version used in Example 1 does not provide sufficient puncture resistance for packaging turkey breasts. A Cryovac Series 8600 impulse sealing machine was used and operated at a seal bar pressure of 1.4 kg/cm². The general procedure for packaging, evacuation and sealing in the Sample 3 and 7 multilayer film bags was the same as outlined in Example 2. However, the Sample 3 and 7 bags were used to surround an inner "Curlon" bag manufactured by Curwood Packaging Company. The turkey breast was first vacuum packaged in the Curlon bag, then the formed package was heat shrunk in hot water. Next the heat shrunk package was inserted in the test bag and further packaged in the Example 1 manner. Then the double packaged turkey breasts were cooked and chilled.

For Sample 3, different packaging rates and sealing voltages were used, i.e., piece rates per minute between 20 and 31 and sealing voltages between 27 and 32 volts. No combination of machine conditions resulted in consistently satisfactory seals. The predominant cause of leakage was failure of the bag to seal through folds at the mouth.

For Sample 7, an embodiment of the invention there were no incidences of leaks at folds and no evidence of burn-through of the bag tails or charring of the seals. With one exception, the leaks using the Sample 7 bags were due to deficiencies unrelated to these bags, primarily puncturing of the Sample 7 outer bag by sharp edges of the inner Curlon bag. Reproductive results of these Example 3 tests are summarized in Table C.

Summarizing Example 3 and Table C, they show that at least one embodiment of this invention is suitable for packaging boneless turkey breasts under typical commercial conditions and at acceptable rebag rate. That is, the packer advised that for commercial acceptance the rebag (leakage) rate should not exceed 5%, and the experimental data indicates that only one of the Sample 7 leaks was attributable to the bag itself. This was the leak due to a cold (weak) seal. Accordingly, the effective leak rate was 1/38 bags or 2.6%.

While this invention has been described with reference to certain specific embodiments, it will be recognized by those skilled in the art that many variations are possible without departing from the scope and spirit of the invention.

TABLE C

| | Turkey Breast Packaging | | | | | | |
|---|---|---|---|---|---|---|---|
| Sample No. | Test Period | Bag Qty | Rebag* Qty | % Rebags | Rebag Cause | Sealer Conditions | |
| | | | | | | Pcs/min | Voltage |
| 3 | 1 | 57 | 27 | 47 | leaks at seal folds | 31 | 27–37 |
| 3 | 2 | 24 | 13 | 54 | same as above | 24–25 | 27–30 |
| 7 | 1 | 15 | 2 | 13 | cold seal, low evacuation | 30 | 25–26 |
| 7 | 2 | 23 | 5 | 22 | Curlon bag in seal area, low evacuation, damage by Curlon bag corner, plastic on seal bar | 25 | 30 |

*Rebagging is needed when there is a leak.

What is claimed is:

1. A tubular article formed of biaxially oriented, differentially cross-linked, heat shrinkable multilayer film irradiated to at least about 2 MR comprising a thermoplastic inner layer and a thermoplastic outer layer, the irradiated inner layer containing an antioxidant in sufficient quantity to adjust its melt flow index to at least about 0.5 and the irradiated outer layer having a melt flow index of less than about 0.7, such that the ratio of said melt flow indices of the inner layer to the outer layer is at least about 1.5.

2. A tubular article according to claim 1 wherein said inner and outer irradiated layers are adhered together.

3. A tubular article according to claim 1 wherein said inner and outer irradiated layers are separated by an oxygen barrier layer.

4. A tubular article formed of biaxially oriented, differentially cross-linked heat shrinkable multilayer film irradiated to at least about 2 MR comprising a thermoplastic inner layer, a thermoplastic outer layer and an oxygen barrier layer between said inner and outer layers and adhered thereto on opposite sides, the irradiated inner layer containing an antioxidant in sufficient quantity to adjust its melt flow index to at least about 0.7 and the irradiated outer layer having a melt flow index of less than about 0.7, such that the ratio of said melt flow indices of the inner layer to the outer layer is at least about 1.5.

5. A tubular article according to claim 4 wherein the ratio of said melt flow indices of the inner layer to the outer layer is at least about 4.

6. A tubular article according to claim 4 wherein the outer layer contains a cross-linking enhancer.

7. A tubular article according to claim 4 wherein said film is irradiated at between about 3 MR and about 5 MR.

8. A tubular article according to claim 4 wherein said antioxidant is selected from the group consisting of 2,6 ditert butyl-4-ethyl phenol (BHEB) and butylated hydroxytoluene (BHT).

9. A tubular article according to claim 4 wherein said antioxidant in said irradiated inner layer provides BHT Equivalency of between about 500 and about 2000 ppm.

10. A tubular article according to claim 4 wherein the major constituent of at least one of said inner and outer layers is ethylene vinyl acetate.

11. A tubular article according to claim 4 wherein the major constituent of said inner and outer layers is ethylene vinyl acetate.

12. A tubular article according to claim 4 wherein said inner and outer layers are formed of at least one member selected from the group consisting of polyethylene and ethylene vinyl acetate.

13. A tubular article according to claim 4 wherein said oxygen barrier layer is a member selected from the group consisting of a vinylidene chloride copolymer, ethylene vinyl alcohol and polyamide.

14. A method of manufacturing a tubular article formed of biaxially oriented differentially cross-linked, heat shrinkable multilayer film comprising the steps of:
a) forming a tube of blown multilayer film comprising a thermoplastic inner layer and a thermoplastic outer layer with the inner layer containing an antioxidant;
b) biaxially orienting said multilayer film to make same heat shrinkable; and
c) irradiating the biaxially oriented heat shrinkable film at dosage of at least about 2 MR to simultaneously adjust the inner layer melt flow index to at least about 0.5 and adjust the outer layer melt flow index to less than about 0.7 such that the ratio of said melt flow indices of the inner layer to the outer layer is at least about 1.5.

15. A method according to claim 14 wherein said inner and outer layers are adhered together.

16. A method according to claim 14 wherein said inner and outer layers are separated by an oxygen barrier layer and adhered thereto on opposite sides thereof.

17. A method according to claim 16 wherein the ratio of said melt flow indices of the inner layer to the outer layer is at least about 4.

18. A method according to claim 16 wherein the outer layer contains a cross-linking enhancer.

19. A method according to claim 16 wherein said film is irradiated at between about 3 MR and about 5 MR.

20. A method according to claim 16 wherein said antioxidant is a member selected from the group consisting of 2,6 ditert butyl-4-ethyl phenol (BHEB) and butylated hydroxytoluene (BHT).

21. A method according to claim 16 wherein said antioxidant in said irradiated inner layer provides BHT Equivalency of between about 500 and about 2000 ppm.

22. A method according to claim 16 wherein the major constituent of at least one of said inner and outer layers is ethylene vinyl acetate.

23. A method according to claim 16 wherein the major constituent of said inner and outer layers is ethylene vinyl acetate.

24. A method according to claim 16 wherein said inner and outer layers are formed of at least one member selected from the group consisting of polyethylene and ethylene vinyl acetate.

25. A method according to claim 16 wherein said oxygen barrier layer is a member selected from the group consisting of a vinylidene chloride copolymer, ethylene vinyl alcohol and polyamide.

26. A food storage bag formed of biaxially oriented, differentially cross-linked and heat shrinkable multilayer film irradiated to at least about 2 MR and comprising a thermoplastic inner layer and a thermoplastic outer layer, the irradiated inner layer containing an antioxidant in sufficient quantity to adjust its melt flow index to at least about 0.5 and the irradiated outer layer having a melt flow index of less than about 0.7, such that the ratio of said melt flow indices of the inner layer to the outer layer is at least about 1.5, with one end of said bag being heat sealed by adhesion between contiguous inner layer surfaces in a direction transverse to the oppositely located side walls of said bag, and with the other mouth end of said bag being impulse heat sealable by fusion bonding between contiguous inner layer surfaces after filling the bag with food.

27. A bag according to claim 26 wherein said inner and outer irradiated layers are adhered together.

28. A bag according to claim 26 wherein said inner and outer irradiated layers are separated by an oxygen barrier layer and adhered thereto on opposite sides thereof.

29. A bag according to claim 26 wherein the ratio of said melt flow indices of the inner layer to the outer layer is at least about 4.

30. A bag according to claim 26 wherein the melt flow index of said inner irradiated layer is at least 0.7.

31. A bag according to claim 26 wherein the melt flow index of said inner irradiated layer is at least 1.0.

32. A bag according to claim 26 wherein the outer layer contains a cross-linking enhancer.

33. A bag according to claim 28 wherein said film is irradiated at between about 3 MR and about 5 MR.

34. A bag according to claim 28 wherein said antioxidant is a member selected from the group consisting of 2,6 ditert butyl-4-ethyl phenol (BHEB) and butylated hydroxytoluene (BHT).

35. A bag according to claim 28 wherein said antioxidant in said irradiated inner layer provides BHT Equivalency of between about 500 and about 2000 ppm.

36. A bag according to claim 28 wherein said antioxidant in said irradiated inner layer provides BHT Equivalency of between about 800 and 1600 ppm.

37. A bag according to claim 28 wherein the major constituent of at least one of said inner and outer layers is ethylene vinyl acetate.

38. A bag according to claim 28 wherein the major constituent of said inner and outer layers is ethylene vinyl acetate.

39. A bag according to claim 28 wherein said inner and outer irradiated layers are formed of at least one member selected from the group consisting of polyethylene and ethylene vinyl acetate.

40. A bag according to claim 28 wherein said oxygen barrier layer is a member selected from the group consisting of a vinylidene chloride-vinyl chloride copolymer, ethylene vinyl alcohol and polyamide.

* * * * *